United States Patent
Wakebe

(10) Patent No.: US 10,857,869 B2
(45) Date of Patent: Dec. 8, 2020

(54) FIXING STRUCTURE OF BATTERY

(71) Applicant: HONDA MOTOR CO., LTD., Tokyo (JP)

(72) Inventor: Kentaro Wakebe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/405,094

(22) Filed: May 7, 2019

(65) Prior Publication Data

US 2019/0366824 A1 Dec. 5, 2019

(30) Foreign Application Priority Data

May 31, 2018 (JP) .................................. 2018-104832

(51) Int. Cl.
| | |
|---|---|
| *B60K 1/00* | (2006.01) |
| *B60K 1/04* | (2019.01) |
| *B62D 25/20* | (2006.01) |
| *H01M 2/10* | (2006.01) |
| *B60R 16/04* | (2006.01) |

(52) U.S. Cl.
CPC ................ *B60K 1/04* (2013.01); *B60R 16/04* (2013.01); *B62D 25/20* (2013.01); *H01M 2/1083* (2013.01); *B60K 2001/0422* (2013.01); *H01M 2220/20* (2013.01)

(58) Field of Classification Search
CPC .... B60K 1/00; B60K 1/04; B60R 7/04; B60R 16/04
See application file for complete search history.

(56) References Cited

U.S. PATENT DOCUMENTS

| | | | | |
|---|---|---|---|---|
| 3,547,274 A | * | 12/1970 | Sosinkski ............... | H02B 1/052 211/89.01 |
| 5,584,525 A | * | 12/1996 | Nakano ................ | B60N 2/4235 296/187.12 |
| 6,811,197 B1 | * | 11/2004 | Grabowski ............... | B60R 7/04 180/68.5 |
| 7,335,051 B2 | * | 2/2008 | Chen .................... | H01M 2/1038 439/500 |
| 7,540,343 B2 | * | 6/2009 | Nakashima .............. | B60K 1/00 180/65.1 |
| 7,771,865 B2 | * | 8/2010 | Takasaki .................. | B60K 1/04 429/71 |

(Continued)

FOREIGN PATENT DOCUMENTS

| | | |
|---|---|---|
| JP | 2008-189242 A | 8/2008 |
| JP | 2009-035094 | 2/2009 |

(Continued)

OTHER PUBLICATIONS

Japanese Office Action with English Translation dated Nov. 12, 2019, 7 pages.

*Primary Examiner* — Hau V Phan
(74) *Attorney, Agent, or Firm* — Rankin, Hill & Clark LLP

(57) ABSTRACT

The fixing member includes a lower contact member 32 and an upper contact member (contact members) that come in contact with a battery to support the battery between a driver seat and a passenger seat (vehicle seats), and the lower contact member and the upper contact member are deformed when a load of a predetermined value or more is input from a vehicle width direction, to allow movement of the battery in the vehicle width direction.

10 Claims, 6 Drawing Sheets

(56) References Cited

U.S. PATENT DOCUMENTS

| | | | | |
|---|---|---|---|---|
| 7,836,999 B2* | 11/2010 | Kato | ..................... | B62D 21/155 |
| | | | | 180/312 |
| 8,376,074 B2* | 2/2013 | Yoda | ..................... | B62D 21/157 |
| | | | | 180/68.5 |
| 9,102,362 B2* | 8/2015 | Baccouche | .......... | B62D 21/157 |
| 2007/0007060 A1* | 1/2007 | Ono | ..................... | B62D 25/025 |
| | | | | 180/65.31 |
| 2007/0289789 A1* | 12/2007 | Tsuchiya | ................. | B60K 1/04 |
| | | | | 180/68.2 |
| 2008/0164081 A1* | 7/2008 | Watanabe | ........... | H01M 10/647 |
| | | | | 180/68.5 |
| 2009/0173558 A1* | 7/2009 | Watanabe | ............... | B60L 50/66 |
| | | | | 180/68.5 |
| 2009/0183935 A1* | 7/2009 | Tsuchiya | ............. | H01M 2/1083 |
| | | | | 180/68.1 |
| 2010/0071980 A1* | 3/2010 | Kokaji | ................ | H01M 2/1077 |
| | | | | 180/68.5 |
| 2010/0089675 A1* | 4/2010 | Nagata | ..................... | B60K 1/04 |
| | | | | 180/68.5 |
| 2011/0000729 A1* | 1/2011 | Schwarz | ............. | B62D 25/087 |
| | | | | 180/68.5 |
| 2013/0140101 A1* | 6/2013 | Lim | ................... | H01M 10/625 |
| | | | | 180/68.5 |
| 2014/0345961 A1* | 11/2014 | Kimura | ..................... | B60L 1/02 |
| | | | | 180/68.5 |

FOREIGN PATENT DOCUMENTS

| | | | |
|---|---|---|---|
| JP | 2013-119326 | A | 6/2013 |
| JP | 2015-106531 | A | 6/2015 |
| JP | 2016-117380 | | 6/2016 |

\* cited by examiner

FIXING STRUCTURE OF BATTERY

INCORPORATION BY REFERENCE

The present application claims priority under 35 U.S.C. § 119 to Japanese Patent Application No. 2018-104832 filed on May 31, 2018. The content of the applications is incorporated herein by reference in its entirety.

BACKGROUND OF THE INVENTION

Field of the Invention

The present invention relates to a fixing structure of a battery, and more particularly to a battery fixing structure to fix a battery for an auxiliary machine mounted in a car.

Description of the Related Art

Heretofore, there has been disclosed, for example, a technique in which a high pressure battery 42 is mounted in a center console, a structure body for use also in a cooling duct is set below the battery, and the duct is bent during input of lateral impact, to absorb the impact due to side collision (e.g., see Patent Literature 1).

Furthermore, as another technique, there is disclosed a technique in which welding points and ribs 75 are appropriately arranged in a protection housing that protects a high pressure battery 32 mounted in a center console, and the ribs 75 contribute to the strength during input of collision impact to absorb the impact in a forward-backward direction and a lateral direction (e.g., see Patent Literature 2).

Patent Literature 1

Japanese Patent Laid-Open No. 2009-035094

Patent Literature 2

Japanese Patent Laid-Open No. 2016-117380

SUMMARY OF THE INVENTION

However, in Patent Literature 1 described above, it is necessary to install an impact absorbing duct under a center console, and hence the center console enlarges in a height direction and takes a large space. Furthermore, it is often assumed that the center console is used as a driver's arm rest, and it is highly likely that restriction in the height direction obstructs such use.

Furthermore, in Patent Literature 2 described above, an impact absorbing member is not placed under a battery, and a surrounding metal structure body is provided with strength. Consequently, there are not any restrictions in a height direction of a center console, but the surrounding metal structure body constitutes a very thick and heavy structure body.

Consequently, for example, a fixing structure of a battery is desired in which impact to the battery can be absorbed without forming a large protection space, when a load is input from a vehicle width direction due to side collision or the like.

An object of the present invention, which has been developed in view of the above respects, is to provide a fixing structure of a battery in which impact to the battery can be absorbed without forming any large protection space, or without adding any heavy and expensive structure body around the fixing structure.

To achieve the above object, according to an aspect of the present invention, there is provided a fixing structure of a battery, including the battery, vehicle seats installed in a vehicle width direction, and a fixing member to fix the battery between the vehicle seats, the fixing member including a contact member that comes in contact with the battery to support the battery between the vehicle seats, wherein the contact member is deformed when a load of a predetermined value or more is input from the vehicle width direction, to allow movement of the battery in the vehicle width direction.

According to this aspect, when the load of the predetermined value or more is input from the vehicle width direction, the contact member is deformed. Consequently, impact due to the input of the load from the vehicle width direction can be absorbed, and a space where the battery is movable can be acquired. The battery can be moved in a direction away from an input direction of the load. As a result, it is possible to protect the battery from the impact during side collision, and it is also possible to prevent predicted occurrence of secondary damage to a passenger in a vehicle due to damage to the battery.

In the above configuration, the contact member is one of a plurality of contact members, and the contact member on a side opposite to a load input direction is deformed when the load of the predetermined value or more is input from the vehicle width direction, to allow the movement of the battery in the vehicle width direction.

According to this configuration, when the load of the predetermined value or more is input from the vehicle width direction, the contact member on the opposite side to the load input direction is deformed. Consequently, impact due to the input of the load from the vehicle width direction can be absorbed. Furthermore, the space where the battery is movable can be acquired, and the battery can be moved in the direction away from the input direction of the load.

In the above configuration, the contact member includes an upper pressing portion that inputs, into the battery, a force toward a direction toward under a floor of a vehicle, and a contact portion that inputs a force in the vehicle width direction, and the contact portion is deformed when the load of the predetermined value or more is input from the vehicle width direction.

According to this configuration, an upper portion of the battery can be pressed by the upper pressing portion. Consequently, when the load is input from the vehicle width direction, movement of the battery in an up-down direction can be regulated, thereby allowing smooth movement of the battery in the width direction.

In the above configuration, the battery is disposed closer to one of the vehicle seats on a basis of a center line of the vehicle width direction.

According to this configuration, the battery is disposed close to one of the vehicle seats, so that maintenance of the battery can be easily performed.

In the above configuration, the battery is mounted in a center console, and a side of the center console to which the battery is disposed closer is removably formed, and an opening through which the battery is exposed is formed in the side.

According to this configuration, the opening through which the battery is exposed is formed in the center console, so that the maintenance or replacement of the battery can be easily performed via the opening.

In the above configuration, the fixing member further includes side plates that protect side surfaces of the battery, and in the side plates, the side plate on the side to which the battery is disposed closer is formed to be stronger than the side plate on a side opposite to the side to which the battery is disposed closer.

According to this configuration, the side plate on the side to which the battery is disposed closer is formed to be stronger than the side plate on the side opposite to the side to which the battery is disposed closer, so that the battery can be protected also when the load is input from the side on which a protection space is smaller.

In the above configuration, a length, in the vehicle width direction, of a space formed between the battery and the vehicle seat when the battery is moved in the vehicle width direction during the input of the load from the vehicle width direction is longer than a length of a seat pipe along which the seat pipe located below the vehicle seat is pushed out to a direction of the battery during the input of the load from the vehicle width direction.

According to this configuration, it is possible to prevent the seat pipe from sticking into the battery and causing damage to the battery.

In the above configuration, a strength of a portion of the side plate disposed at a position that overlaps with the seat pipe in side view is higher than a strength of another portion of the side plate.

According to this configuration, the side plate is formed so that the strength of the portion of the side plate disposed at the position that overlaps with the seat pipe in side view is higher than the strength of the other portion of the side plate, so that it is possible to prevent the seat pipe from causing the damage to the battery.

In the above configuration, the fixing member further includes a battery supporter on which the battery is mounted, and a portion of the battery supporter which is coupled to the side plate is formed to tilt.

According to this configuration, if the side plate falls in the case where the load is input from the vehicle width direction, it is possible to prevent the fixed side plate from being disconnected because of the tilt of the battery supporter.

In the above configuration, the battery is a battery for an auxiliary machine.

According to this configuration, the present invention can be applied to the battery for the auxiliary machine.

According to the aspect of the present invention, the contact member is deformed, so that the impact due to the input of the load from the vehicle width direction can be absorbed. Furthermore, the space where the battery is movable can be acquired, and the battery can be moved in the direction away from the input direction of the load. As a result, it is possible to protect the battery from the impact during the side collision, and it is also possible to prevent the predicted occurrence of the secondary damage to the passenger in the vehicle due to the damage to the battery.

Furthermore, when the battery is moved in the vehicle width direction, the space can be acquired on a side of a load input surface. Consequently, a large protection space does not have to be acquired on both right and left sides of the battery. Furthermore, it is not necessary to add a heavy and expensive structure body around the battery, and restrictions on a space where the battery is installed are noticeably decreased. However, when the load is input, it is possible to securely protect the battery.

DETAILED DESCRIPTION OF THE PREFERRED EMBODIMENTS

Hereinafter, description will be made as to an embodiment of the present invention with reference to the drawings.

Figure 1:
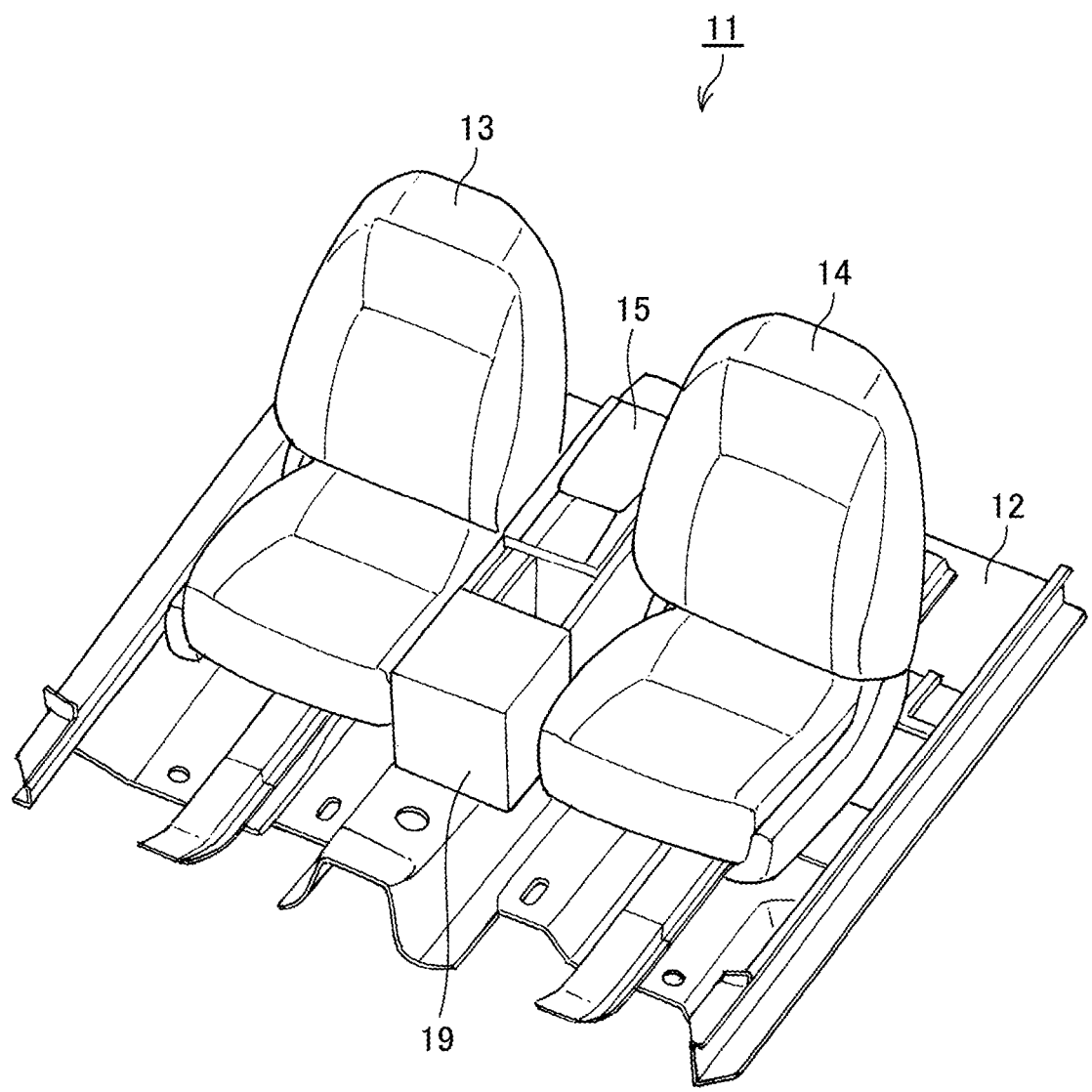
FIG. 1 is a schematic perspective view showing an embodiment of a car in which a fixing structure of a battery is provided according to the present invention.
Figure 2:
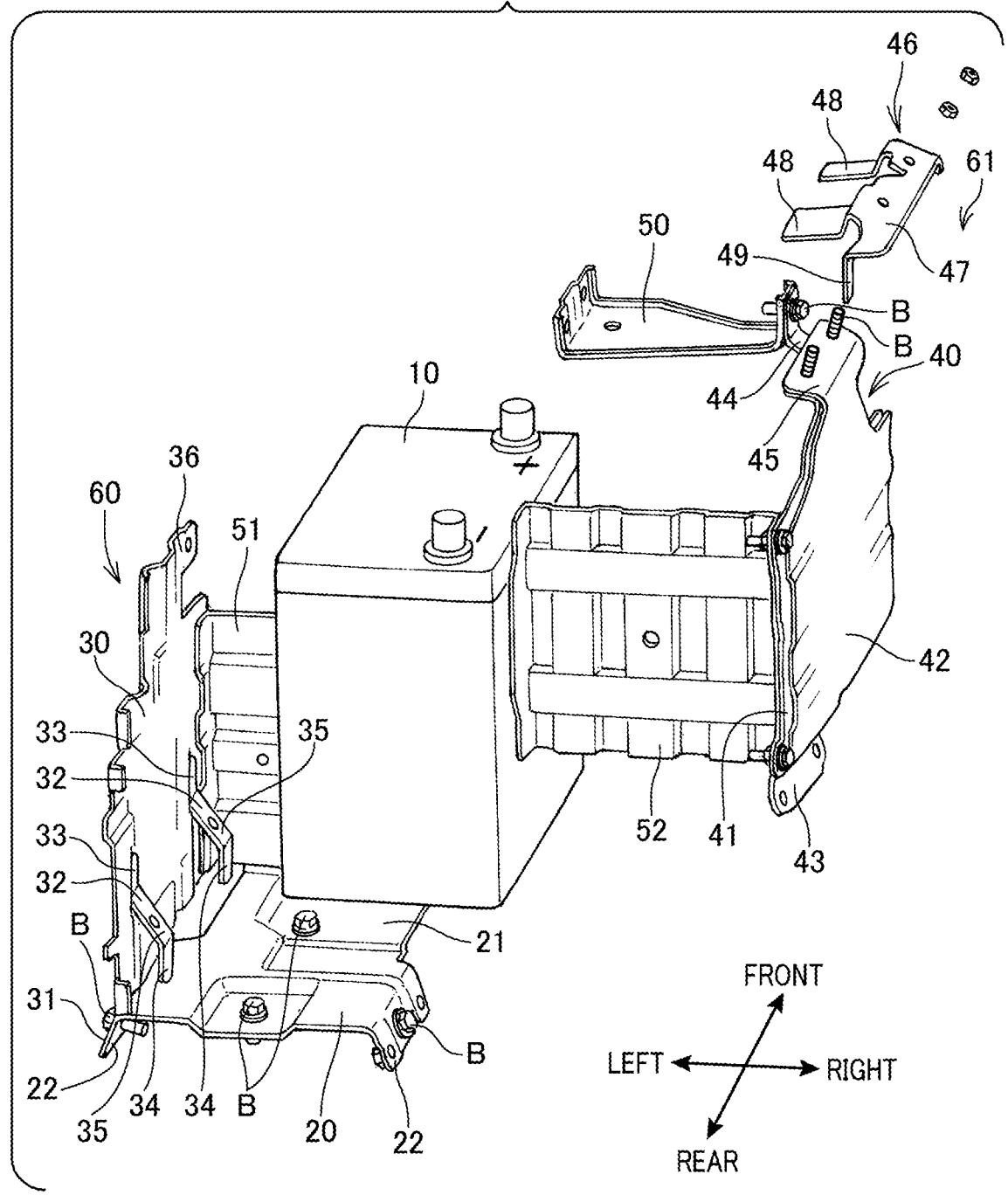
FIG. 2 is an exploded perspective view showing the fixing structure of the battery according to an embodiment of the present invention.
Figure 3:
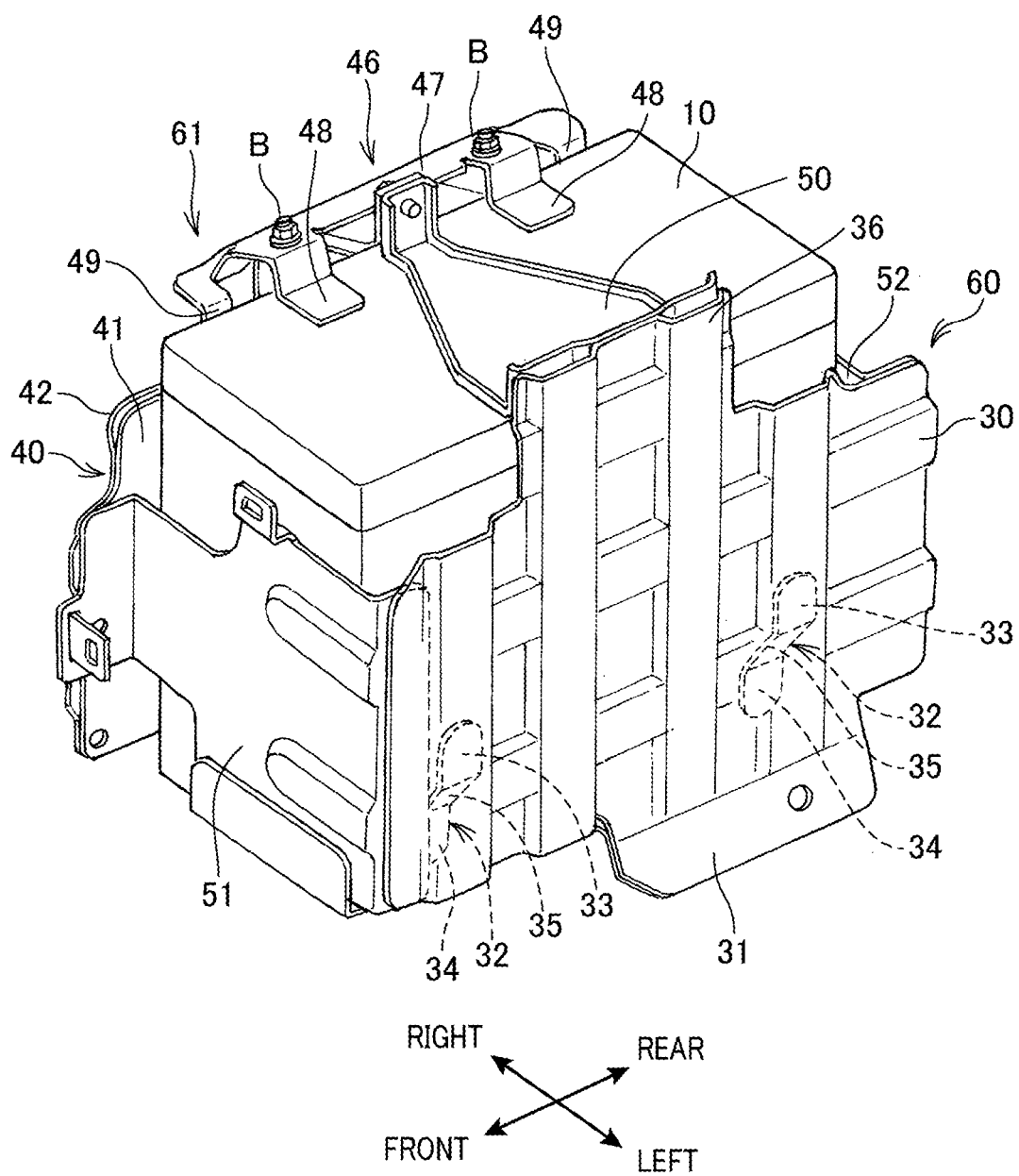
FIG. 3 is a perspective view of the fixing structure of the battery according to the present embodiment as viewed from a left side.
Figure 4:
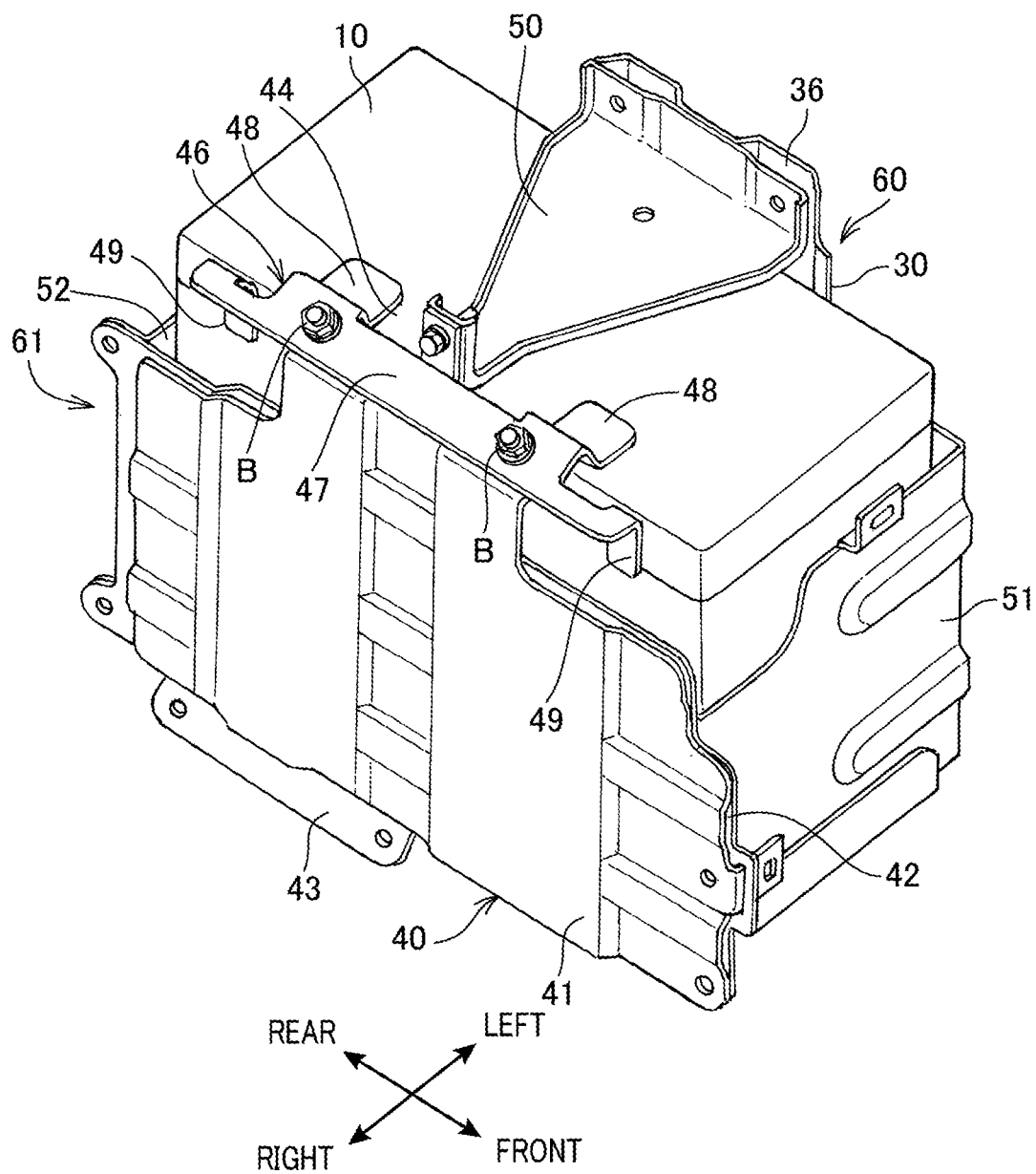
FIG. 4 is a perspective view of the fixing structure of the battery according to the present embodiment as viewed from a right side.
Figure 5:
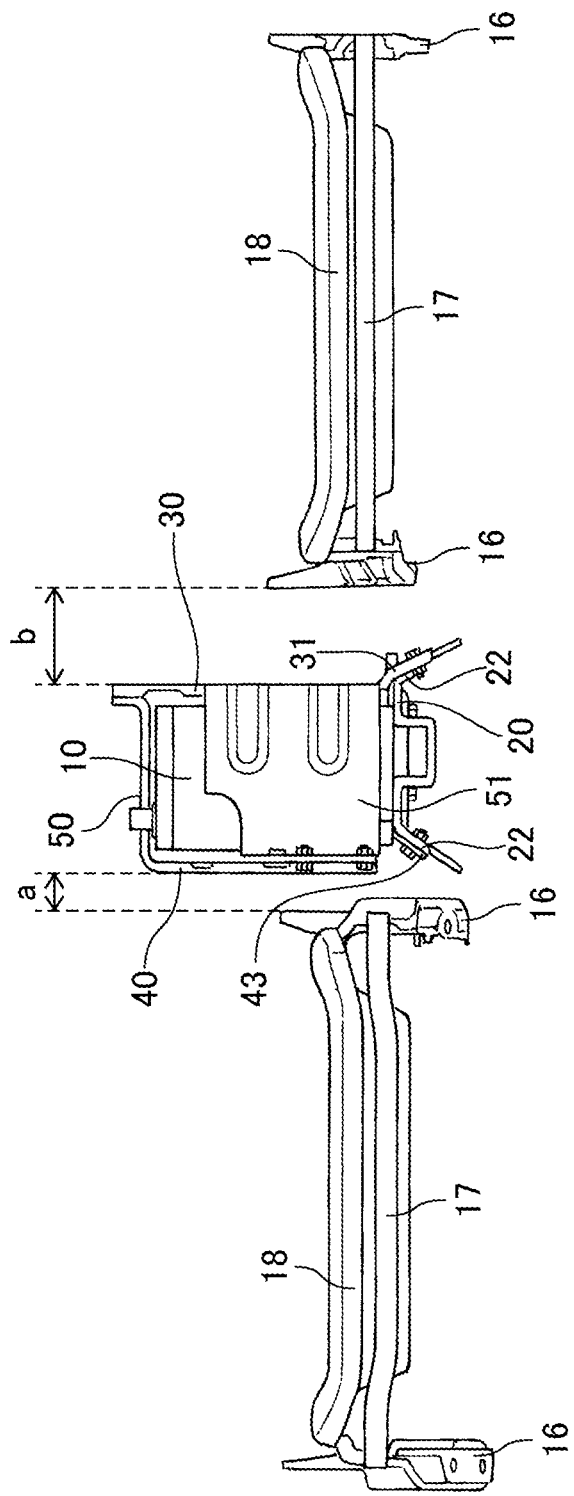
FIG. 5 is a front view showing the fixing structure of the battery according to the present embodiment.
Figure 6:
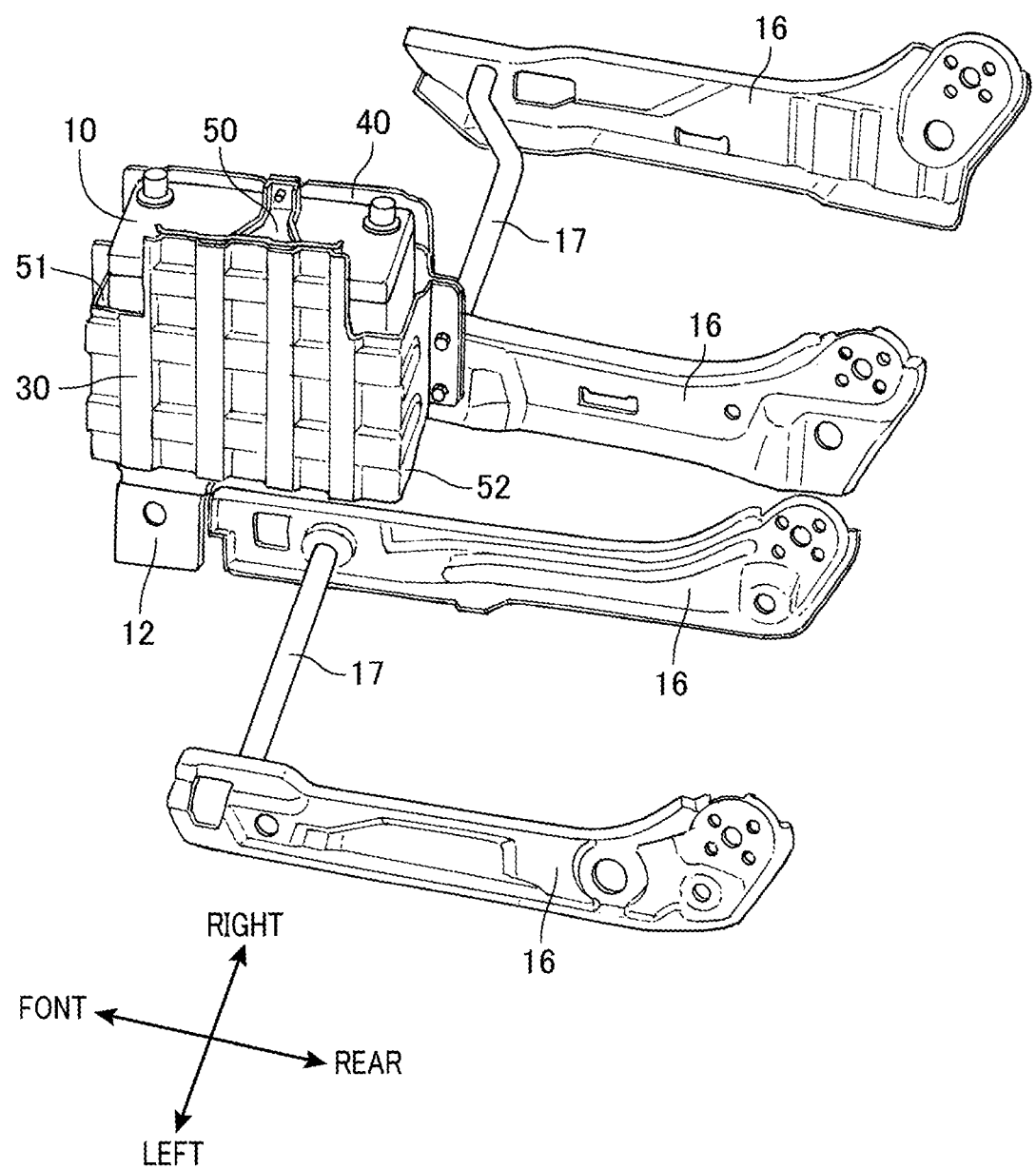
FIG. 6 is a perspective view showing the fixing structure of the battery according to the present embodiment.

FIG. 1 is a schematic perspective view showing an embodiment of a car in which a fixing structure of a battery is provided according to the present invention. FIG. 2 is an exploded perspective view showing the fixing structure of the battery according to an embodiment of the present invention. FIG. 3 is a perspective view of the fixing structure of the battery according to the present embodiment as viewed from a left side. FIG. 4 is a perspective view of the fixing structure of the battery according to the present embodiment as viewed from a right side. FIG. 5 is a front view showing the fixing structure of the battery according to the present embodiment. FIG. 6 is a perspective view showing the fixing structure of the battery according to the present embodiment.

Note that in FIG. 5, the right side in the drawing is considered to be a driver seat side, and the left side in the drawing is considered to be a passenger seat side, and in FIG. 6, a lower side in the drawing is considered to be the driver seat side and an upper side in the drawing is considered to be the passenger seat side. That is, each of FIG. 5 and FIG. 6 shows an example where a driver seat is provided on the left side of a car 11.

A battery 10 in the present embodiment is the battery 10 for an auxiliary machine mounted in a car that is an electric vehicle such as a hybrid vehicle or an electric car. The battery 10 is a secondary battery, for example, a lithium ion battery that is chargeable and dischargeable.

As shown in FIG. 1, FIG. 5 and FIG. 6, in the present embodiment, the car 11 includes a floor panel 12. A driver seat 13 and a passenger seat 14, which are vehicle seats, are arranged side by side, respectively, on a top side of the floor panel 12. A center console 15 is disposed between the driver seat 13 and the passenger seat 14.

On the top side of the floor panel 12, seat support plates 16 are provided to support the driver seat 13 and the passenger seat 14, respectively. Each of the seat support plates 16 is formed in a plate shape extending in a forward-backward direction. A pair of seat support plates 16 that support the driver seat 13 and a pair of seat support plates 16 that support the passenger seat 14 are provided at predetermined intervals in a vehicle width direction. A seat pipe 17 is disposed between the respective seat support plates 16 in front of the pair of seat support plates 16 that support the driver seat 13. Similarly, the seat pipe 17 is disposed between the respective seat support plates 16 in front of the pair of seat support plates 16 that support the passenger seat 14.

As shown in FIG. 5, on upside of the respective seat support plates 16, a seat surface frame 18 of the driver seat 13 and a seat surface frame 18 of the passenger seat 14 are provided. In this way, the driver seat 13 and the passenger seat 14 are supported by the seat support plates 16 that include the seat pipes 17 and the seat surface frames 18. Furthermore, the driver seat 13 and the passenger seat 14 are movable in the forward-backward direction, so that seating positions are adjustable.

A battery compartment 19 is disposed in front of the center console 15, and the battery 10 is contained in the battery compartment 19.

Although not shown, a removable side lid is disposed in a side surface of the battery compartment 19 disposed in the center console 15. Furthermore, when the side lid is removed, an opening (not shown) is formed in a side surface of the center console 15, and the battery 10 is exposed through this opening, thereby enabling maintenance of the battery 10. Note that in the present embodiment, as will be described later, a battery support plate, that is, the battery 10 is disposed close to the passenger seat 14, and hence the side lid is formed on a passenger seat 14 side.

Next, the fixing structure of the battery will be described in detail.

As shown in FIG. 2 to FIG. 4, the fixing structure includes a battery support plate 20 as a battery supporter that is held substantially horizontally so that the battery 10 is mounted on the plate. Although not shown, the battery support plate 20 is fixed to the floor panel 12 via bolts B.

The battery support plate 20 includes a substantially flat mounting plate 21 on which the battery 10 is mounted, and fixing flanges 22 extending obliquely downward are integrally provided on both sides of a rear end of the mounting plate 21. The fixing flange 22 is formed at a position substantially similar to a position at which the seat pipe 17 is installed in the forward-backward direction. That is, the fixing flange 22 is formed at a position that may overlap with the seat pipe 17 in side view.

As shown in FIG. 5, the battery support plate 20 is disposed between the seat support plate 16 on a driver seat 13 side and the seat support plate 16 on the passenger seat 14 side, but in the present embodiment, the battery support plate 20 is disposed close to the seat support plate 16 on the passenger seat 14 side. That is, as shown in FIG. 5, a gap a between the seat support plate 16 on the passenger seat 14 side and the battery is formed to be smaller than a gap b between the seat support plate 16 on the driver seat 13 side and the battery.

The battery 10 supported by the battery support plate 20 is formed so that a length, in the vehicle width direction, of a space formed between the battery 10 and the driver seat 13 or the passenger seat 14 when the battery 10 is moved in the vehicle width direction during input of a load from the vehicle width direction is longer than a length of the seat pipe 17 along which the seat pipe 17 is pushed out to a direction of the battery 10 during the input of the load from the vehicle width direction.

That is, a space between the battery 10 and the driver seat 13 or the passenger seat 14 is held to such an extent that the seat pipe 17 does not apply any load to the battery 10, even when the load is input from the vehicle width direction and the seat pipe 17 is pushed out toward the battery 10.

A left-side plate 30 is welded and bonded to one side of the battery support plate 20 (on the driver seat 13 side in the present embodiment). A right-side plate 40 is disposed on the other side of the battery support plate 20.

A lower fixing piece 31 that protrudes obliquely downward is formed in a lower end portion of the left-side plate 30, and the lower fixing piece 31 and the fixing flange 22 are fixed via the bolts B, to fix the left-side plate 30 and the battery support plate 20 to the floor panel 12.

On an inner lower side of the left-side plate 30, two lower contact members 32 that are contact members are provided at a predetermined interval in the forward-backward direction. Each of the lower contact members 32 includes an attaching piece 33 to be attached to the left-side plate 30, a contact piece 34 that comes in contact with a lower portion of a side surface of the battery 10, and a coupling piece 35 tilted to couple the attaching piece 33 and the contact piece 34.

The contact piece 34 of the lower contact member 32 abuts on the lower portion of the side surface of the battery 10, to support the lower portion of the side surface of the battery 10. Furthermore, when a load of a predetermined value or more is input into the battery 10 from the vehicle width direction, the coupling piece 35 of the lower contact member is deformed. Consequently, the lower contact member has a function of allowing movement of the battery 10 in the vehicle width direction.

The left-side plate 30 has such a height dimension that the plate slightly protrudes from an upper surface of the battery 10, and an upper fixing portion 36 is formed in an upper end portion of the left-side plate 30.

The right-side plate 40 includes two plies of an inner right-side plate 41 and an outer right-side plate 42, and therefore has a strength that is higher than a strength of the left-side plate 30. That is, the battery support plate 20 is usually disposed between the seat support plate 16 on the driver seat 13 side and the seat support plate 16 on the passenger seat 14 side, but in the present embodiment, the battery support plate 20 is disposed close to the seat support plate 16 on the passenger seat 14 side. Therefore, when the load is input into the seat pipe 17 on the passenger seat 14 side in a width direction due to side collision or the like, the seat pipe 17 may abut on the right-side plate 40. However, the right-side plate 40 is configured so that the strength of the right-side plate is higher than the strength of the left-side plate 30, and accordingly the damage caused to the right-side plate 40 by the seat pipe 17 can be decreased.

A lower fixing piece 43 that protrudes obliquely downward is formed in a lower end portion of the inner right-side plate 41, and the lower fixing piece 43 is fixed to the fixing flange 22 via the bolts B, thereby fixing the inner right-side plate 41 to the battery support plate 20. Furthermore, an upper fixing piece 44 is provided in an upper end portion of the inner right-side plate 41.

The fixing flange 22 of the battery support plate 20 is formed to extend obliquely downward, and the right-side plate 40 is fixed to the fixing flange 22 via the bolts B. Consequently, if the right-side plate 40 or the left-side plate 30 falls in the case where the load is input from the vehicle width direction, the fixing flange 22 is not disconnected from the right-side plate 40 because of the tilt of the fixing flange 22.

Furthermore, the fixing flange 22 is formed at a position substantially similar to a position at which the seat pipe 17 is installed, in the forward-backward direction, and each of the right-side plate 40 and the left-side plate 30 is fixed to the fixing flange 22 via the bolts B. Consequently, regions to be fixed via the bolts B can be increased in a region corresponding to the seat pipe 17, and a strength of the region corresponding to the seat pipe 17 can increase.

An upper support piece 45 that tilts and extends obliquely upward is disposed to protrude from an upper end portion of the outer right-side plate 42. An upper contact member 46 is attached as a contact member to the upper support piece 45. The upper contact member 46 includes a main body plate 47 that abuts on an upper surface of the upper support piece 45, upper pressing plates 48 as upper pressing portions that extend from both sides of the main body plate 47, and contact plates 49 as contact portions that extend downward from both end portions of the upper contact member.

The contact plates 49 abut on upper portions of side surfaces of the battery 10, to support the upper portions of the side surfaces of the battery 10. Furthermore, when the load of the predetermined value or more is input into the battery 10 from the vehicle width direction, the contact plates are deformed, thereby performing a function of allowing the movement of the battery 10 in the vehicle width direction.

Furthermore, the upper portion of the battery 10 can be pressed by the upper pressing plates 48. Consequently, even when the load is input from the vehicle width direction, excessive movement of the battery 10 in an up-down direction can be regulated, and the battery 10 can be smoothly moved in the width direction.

Note that "deformation" described herein includes a state of remaining deformed by the input of the load, and additionally includes a case where a component, deformed by the input of the load, returns to an original state.

An upper support member 50 is disposed between the upper fixing portion 36 of the left-side plate 30 and the upper fixing piece 44 of the inner right-side plate 41. The upper support member 50 is formed in a substantially trapezoidal shape in planar view. A side of the member which has a small width dimension is attached to the upper fixing piece 44 via the bolts B, and a side of the member which has a large width dimension is attached to the upper fixing portion 36 via the bolts B, respectively.

The upper support member 50 supports the upper portion of the battery 10.

Furthermore, as shown in FIG. 2, a front plate 51 is disposed in front of the battery 10. One side of the front plate 51 is welded and bonded to the left-side plate 30, and the other side of the front plate 51 is fixed to and held by the right-side plate 40 via the bolts B.

A rear plate 52 is disposed on a rear of the battery 10, and the battery is held by fixing both sides of the rear plate 52 to the right-side plate 40 and the left-side plate 30 via the bolts B.

According to this configuration, a periphery of the battery 10 is held by the right-side plate 40, the left-side plate 30, the front plate 51 and the rear plate 52, and the upper portion of the battery 10 is held by the upper support member 50.

Furthermore, on the left side of the battery 10, the left-side plate 30 and the lower contact members 32 constitute a left-side fixing member 60, and on the right side of the battery 10, the right-side plate 40 and the upper contact member 46 constitute a right-side fixing member 61.

Note that in the above embodiment, it is described that the battery support plate 20 is disposed close to the seat support plate 16 on the passenger seat 14 side, but the battery support plate 20 may be disposed close to the seat support plate 16 on the driver seat side. In this case, the above described fixing structure of the battery may have a right and left inverted structure.

Next, an operation of the present embodiment will be described.

In the present embodiment, when the load of the predetermined value or more is input from the vehicle width direction due to the side collision of the car 11 or the like, the coupling piece 35 of the lower contact member 32 or the contact plate 49 of the upper contact member 46 is deformed. Consequently, the impact due to the input of the load from the vehicle width direction can be absorbed. Furthermore, a space where the battery 10 is movable can be acquired, and the battery 10 can move in a direction away from an input direction of the load.

For example, when a load is input from the passenger seat 14 side, the coupling piece 35 of the lower contact member 32 of the left-side plate 30 on the driver seat 13 side opposite to the passenger seat 14 is deformed. Consequently, a space where the battery 10 moves toward the driver seat 13 can be acquired, and the battery 10 can move in the vehicle width direction.

Furthermore, when a load is input from the driver seat 13 side, the contact plate 49 of the upper contact member 46 of the right-side plate 40 on the passenger seat 14 side opposite to the driver seat 13 is deformed. Consequently, a space where the battery 10 moves toward the passenger seat 14 can be acquired, and the battery 10 can move in the vehicle width direction.

Thus, the battery 10 can move when the load is input from the width direction, so that the battery 10 installed in the center console 15 can be protected from the impact during side collision. Furthermore, it is possible to prevent predicted occurrence of secondary damage to a passenger in a vehicle due to damage to the battery 10.

Furthermore, when the battery 10 is moved in the vehicle width direction, a space can be acquired on a side of a load input surface. Consequently, a large protection space does not have to be acquired on both the right and left sides of the battery, and restrictions on a space where the battery 10 is installed are noticeably decreased. However, when the load is input, it is possible to securely protect the battery 10.

Furthermore, the battery 10 is disposed close to the passenger seat 14, and hence the protection space on the passenger seat 14 side becomes smaller than the protection space on the driver seat 13 side. However, in the present embodiment, the right-side plate 40 includes two plies of the inner right-side plate 41 and the outer right-side plate 42, and the strength of the right-side plate 40 is set to be higher than the strength of the left-side plate 30. Consequently, also when the load is input from the passenger seat 14 side in which the protection space is small, the battery 10 can be protected.

Additionally, for the battery 10, a length, in the vehicle width direction, of a space formed between the battery 10 and the driver seat 13 or the passenger seat 14 when the battery 10 is moved in the vehicle width direction during the input of the load from the vehicle width direction is longer than a length of the seat pipe 17 along which the seat pipe 17 is pushed out to a direction of the battery 10 during the input of the load from the vehicle width direction. Therefore, it is possible to prevent the seat pipe 17 from sticking into the battery 10 and causing damage to the battery 10.

Furthermore, a strength of the right-side plate 40 or the left-side plate 30 or a strength of both the right-side plate 40 and the left-side plate 30, which are disposed at a position that overlaps with the seat pipe 17 in side view is set to be higher than a strength of another region, so that it is possible to prevent the seat pipe 17 from causing damage to the battery 10. Additionally, the fixing flange 22 of the plate that supports the battery 10 is formed to extend obliquely downward, and the right-side plate 40 is fixed to the fixing flange 22 via the bolts B. Consequently, if the right-side plate 40 falls in the case where the load is input from the vehicle width direction, the fixing flange 22 fixed to the right-side plate 40 can be prevented from being disconnected from the plate because of the tilt of the fixing flange 22, and a strength required to protect the side surface of the battery can be prevented from dropping due to the fall. The left-side plate 30 is welded to and fixed to the fixing flange 22 via the bolts B, so that the same effects as described above can be obtained.

As described above, in the present embodiment, the fixing member includes the lower contact member 32 and the upper contact member 46 (the contact members) which come in contact with the battery 10 to support the battery 10 between the driver seat 13 and the passenger seat 14 (vehicle seats). The lower contact member 32 and the upper contact member 46 are deformed when the load of the predetermined value or more is input from the vehicle width direction, to allow movement of the battery 10 in the vehicle width direction.

In consequence, when the load of the predetermined value or more is input from the vehicle width direction due to the side collision of the car 11 or the like, the lower contact member 32 or the upper contact member 46 is deformed. Consequently, the impact due to the input of the load from the vehicle width direction can be absorbed. Furthermore, the space where the battery 10 is movable can be acquired, and the battery 10 can be moved in the direction away from the input direction of the load. As a result, it is possible to protect the battery 10 from the impact during the side collision, and it is also possible to prevent the predicted occurrence of the secondary damage to the passenger in the vehicle due to the damage to the battery 10.

Furthermore, when the battery 10 is moved in the vehicle width direction, the space can be acquired on the side of the load input surface. Consequently, the large protection space does not have to be acquired on both the right and left sides of the battery 10. Additionally, it is not necessary to add a heavy and expensive structure body around the battery, and the restrictions on the space where the battery 10 is installed are noticeably decreased. However, when the load is input, it is possible to securely protect the battery 10.

In addition, according to the present embodiment, the lower contact member 32 and the upper contact member 46 (the contact members) are provided. The upper contact member 46 or the lower contact member 32 on a side opposite to the load input direction is deformed when the load of the predetermined value or more is input from the vehicle width direction, to allow movement of the battery 10 in the vehicle width direction.

In consequence, when the load of the predetermined value or more is input from the vehicle width direction, the lower contact member 32 or the upper contact member 46 on the side opposite to the load input direction is deformed. Consequently, the impact due to the input of the load from the vehicle width direction can be absorbed. Furthermore, the space where the battery 10 is movable can be acquired, and the battery 10 can be moved in the direction away from the input direction of the load.

Furthermore, in the present embodiment, the upper contact member 46 (the contact member) includes the upper pressing plates 48 (the upper pressing portions) that input, into the battery 10, a force toward a direction toward under a floor of the vehicle, and the contact plates 49 (contact portions) that input a force in the vehicle width direction, and the contact plates are deformed when the load of the predetermined value or more is input from the vehicle width direction.

Thus, the upper portion of the battery 10 can be pressed by the upper pressing plates 48. Consequently, when the load is input from the vehicle width direction, the movement of the battery 10 in the up-down direction can be regulated, and the battery 10 can be smoothly moved in the width direction.

Additionally, in the present embodiment, the battery 10 is disposed closer to one of the driver seat 13 and the passenger seat 14 on a basis of a center line of the vehicle width direction.

Thus, the battery is disposed closer to the driver seat 13 or the passenger seat 14, so that maintenance of the battery 10 can be easily performed.

Furthermore, in the present embodiment, the battery 10 is mounted in the center console 15, and a side of the center console 15 to which the battery 10 is disposed closer is removably formed, and an opening through which the battery 10 is exposed is formed in the side.

Consequently, the maintenance or replacement of the battery 10 can be easily performed via the opening.

Further in the present embodiment, the fixing member further includes the right-side plate 40 and the left-side plate 30 (side plates) that protect side surfaces of the battery 10, and in the side plates, the left-side plate 30 of the side to which the battery 10 is disposed closer is formed to be stronger than the right-side plate 40 on a side opposite to the side to which the battery 10 is disposed closer.

Furthermore, the right-side plate 40 includes two plies of the inner right-side plate 41 and the outer right-side plate 42, and the strength of the right-side plate 40 is set to be higher than the strength of the left-side plate 30. Consequently, also when the load is input from the passenger seat 14 side in which the protection space is small, the battery 10 can be protected.

Additionally, in the present embodiment, the length, in the vehicle width direction, of the space formed between the battery 10 and the driver seat 13 or the passenger seat 14 (the vehicle seat) when the battery 10 is moved in the vehicle width direction during the input of the load from the vehicle width direction is longer than the length of the seat pipe 17 along which the seat pipe 17 located below the driver seat 13 or the passenger seat 14 is pushed out to the direction of the battery 10 during the input of the load from the vehicle width direction.

Consequently, it is possible to prevent the seat pipe 17 from sticking into the battery 10 and causing damage to the battery 10.

Furthermore, in the present embodiment, the strength of the portion of the right-side plate 40 or the left-side plate 30 (the side plate) disposed at the position that may overlap with the seat pipe 17 in side view is higher than the strength of the other portion.

Thus, the strength of the right-side plate 40 or the left-side plate 30 disposed at the position that may overlap with the seat pipe 17 in side view is set to be higher than the strength of the other portion, so that the seat pipe 17 can be prevented from causing damage to the battery 10.

Additionally, in the present embodiment, the fixing member further includes the battery support plate 20 (a battery supporter) on which the battery 10 is mounted, and the portion of the fixing flange 22 of the battery support plate 20 which is coupled to the right-side plate 40 or the left-side plate 30 (the side plate) is formed to tilt.

Consequently, if the right-side plate 40 or the left-side plate 30 falls in the case where the load is input from the vehicle width direction, the fixing flange 22 fixed to the right-side plate 40 or the left-side plate 30 can be prevented from being disconnected from the plate because of the tilt of the fixing flange 22, and strength drop can be prevented.

Note that the present invention has been described on the basis of the embodiment, but the present invention is not limited to the present embodiment. One embodiment of the present invention is merely illustrated, and can be therefore arbitrarily changed and applied without departing from the gist of the present invention.

In the above embodiment, it has been described that the gap a between the seat support plate 16 on the passenger seat 14 side and the battery is formed to be smaller than the gap b between the seat support plate 16 on the driver seat 13 side and the battery, but the gap b between the seat support plate 16 on the driver seat 13 side and the battery may be formed to be smaller. In this case, the left-side plate on the driver seat 13 side may be formed to be stronger.

10 battery
11 car
13 driver seat
14 passenger seat
15 center console
16 seat support plate
17 seat pipe
19 battery compartment
20 battery support plate
21 mounting plate
22 fixing flange
30 left-side plate
32 lower contact member
33 attaching piece
34 contact piece
35 coupling piece
40 right-side plate
41 inner right-side plate
42 outer right-side plate
46 upper contact member
47 main body plate
48 upper pressing plate
49 contact plate
50 upper support member
51 front plate
52 rear plate
60 fixing member
61 fixing member

What is claimed is:

1. A fixing structure of a battery, comprising:
the battery,
vehicle seats installed in a vehicle width direction, and
a fixing member to fix the battery between the vehicle seats, the fixing member including a contact member that comes in contact with the battery to support the battery between the vehicle seats, wherein
the contact member is deformed when a load is input from the vehicle width direction, to allow movement of the battery in the vehicle width direction,
the battery is disposed closer to one of the vehicle seats on a basis of a center line of the vehicle width direction,
the fixing member further comprises a left-side plate that protect a left-side surface of the battery in the vehicle width direction, and a right-side plate that protects a right-side surface of the battery in the vehicle width direction,
among the left-side side plate and the right-side plate, the one of the left-side plate and the right-side plate on a side of the battery facing the one of the vehicle seats to which the battery is disposed closer is formed to be stronger than the other of the left-side side plate and the right-side plate,
a length, in the vehicle width direction, of a space formed between the battery and the vehicle seat when the battery is moved in the vehicle width direction during the input of the load from the vehicle width direction is longer than a length of a seat pipe along which the seat pipe located below the vehicle seat is pushed out to a direction of the battery during the input of the load from the vehicle width direction.

2. The fixing structure of the battery according to claim 1, wherein the contact member is one of a plurality of contact members, and the contact member on a side opposite to a load input direction is deformed when the load is input from the vehicle width direction, to allow the movement of the battery in the vehicle width direction.

3. The fixing structure of the battery according to claim 2, wherein the contact member comprises an upper pressing portion that inputs, into the battery, a force toward a direction toward under a floor of a vehicle, and a contact portion that inputs a force in the vehicle width direction, and the contact portion is deformed when the load is input from the vehicle width direction.

4. The fixing structure of the battery according to claim 1, wherein the contact member comprises an upper pressing portion that inputs, into the battery, a force toward a direction toward under a floor of a vehicle, and a contact portion that inputs a force in the vehicle width direction, and the contact portion is deformed when the load is input from the vehicle width direction.

5. The fixing structure of the battery according to claim 1, wherein a strength of a portion of each of the left-side plate and the right-side plate disposed at a position that overlaps with the seat pipe in side view is higher than a strength of another portion.

6. The fixing structure of the battery according to claim 1, wherein the battery is a battery for an auxiliary machine.

7. The fixing structure of the battery according to claim 1, wherein the battery is in contained in a battery compartment, the battery compartment is disposed at a center console, and
a side lid is removably formed at a side of the battery compartment corresponding to a side of the battery facing the one of the vehicle seats to which the battery is disposed closer, and an opening through which the battery is exposed is formed in the center console.

8. A fixing structure of a battery, comprising:
the battery,
vehicle seats installed in a vehicle width direction, and
a fixing member to fix the battery between the vehicle seats, the fixing member including a contact member that comes in contact with the battery to support the battery between the vehicle seats, wherein
the contact member is deformed when a load is input from the vehicle width direction, to allow movement of the battery in the vehicle width direction,
the battery is disposed closer to one of the vehicle seats on a basis of a center line of the vehicle width direction,
the battery is contained in a battery compartment, the battery compartment is disposed at a center console, and
a side lid is removably formed at a side of the battery compartment corresponding to a side of the battery facing the one of the vehicle seats to which the battery is disposed closer, and an opening through which the battery is exposed is formed in the center console.

9. A fixing structure of a battery, comprising:

the battery, vehicle seats installed in a vehicle width direction, and a fixing member to fix the battery between the vehicle seats, the fixing member including a contact member that comes in contact with the battery to support the battery between the vehicle seats, wherein the contact member is deformed when a load is input from the vehicle width direction, to allow movement of the battery in the vehicle width direction, the battery is disposed closer to one of the vehicle seats on a basis of a center line of the vehicle width direction, the fixing member further comprises a left-side plate that protects a left-side surface of the battery in the vehicle width direction, and a right-side plate that protects a right-side surface of the battery in the vehicle width direction, and among the left-side plate and the right-side plate, the one of the left-side plate and the right-side plate on a side of the battery facing the one of the vehicle seats to which the battery is disposed closer is formed to be stronger than the other of the left-side plate and the right-side plate.

10. The fixing structure of the battery according to claim 9, wherein the fixing member further comprises a battery supporter on which the battery is mounted, and a portion of the battery supporter which is coupled to one of the left-side plate and the right-side plate is formed to tilt.

\* \* \* \* \*